United States Patent
Factor et al.

(10) Patent No.: US 9,571,576 B2
(45) Date of Patent: Feb. 14, 2017

(54) STORAGE APPLIANCE, APPLICATION SERVER AND METHOD THEREOF

(75) Inventors: Michael E. Factor, Haifa (IL);
Matthew Albert Huras, Ontario (CA);
Aamer Sachedina, Ontario (CA);
Paula Kim Ta-Shma, Tel Aviv (IL);
Avishay Traeger, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 12/955,943

(22) Filed: Nov. 30, 2010

(65) Prior Publication Data

US 2012/0136977 A1 May 31, 2012

(51) Int. Cl.
*G06F 15/173* (2006.01)
*H04L 29/08* (2006.01)

(52) U.S. Cl.
CPC .................................. *H04L 67/1097* (2013.01)

(58) Field of Classification Search
CPC .............. G06F 11/1456; G06F 11/2007; G06F 11/2028; G06F 11/2035; G06F 11/2046; G06F 11/2092; G06F 11/1464; G06F 3/0601; G06F 11/2005; G06F 11/201; G06F 11/2051; G06F 2003/0692
See application file for complete search history.

(56) References Cited

U.S. PATENT DOCUMENTS

| | | |
|---|---|---|
| 7,457,880 B1 | 11/2008 | Kim |
| 7,512,663 B1 | 3/2009 | Kodama et al. |
| 7,594,002 B1 | 9/2009 | Thorpe et al. |
| 2005/0010709 A1* | 1/2005 | Davies et al. ................ 710/305 |
| 2008/0022120 A1 | 1/2008 | Factor et al. |
| 2010/0064169 A1* | 3/2010 | Davies et al. .................... 714/6 |
| 2012/0102455 A1* | 4/2012 | Ambat et al. ................. 717/115 |

FOREIGN PATENT DOCUMENTS

| | | |
|---|---|---|
| CN | 101291347 | 10/2008 |
| CN | 101414244 | 4/2009 |
| CN | 101588389 | 11/2009 |
| CN | 101741861 | 6/2010 |

\* cited by examiner

*Primary Examiner* — Cheikh Ndiaye

(57) ABSTRACT

A storage appliance system is disclosed which may include at least one application server for locally executing an application, and one or more storage servers in communication with the application server for I/O transmission therebetween. Also disclosed are an application server, a method, and a computer program product.

17 Claims, 4 Drawing Sheets

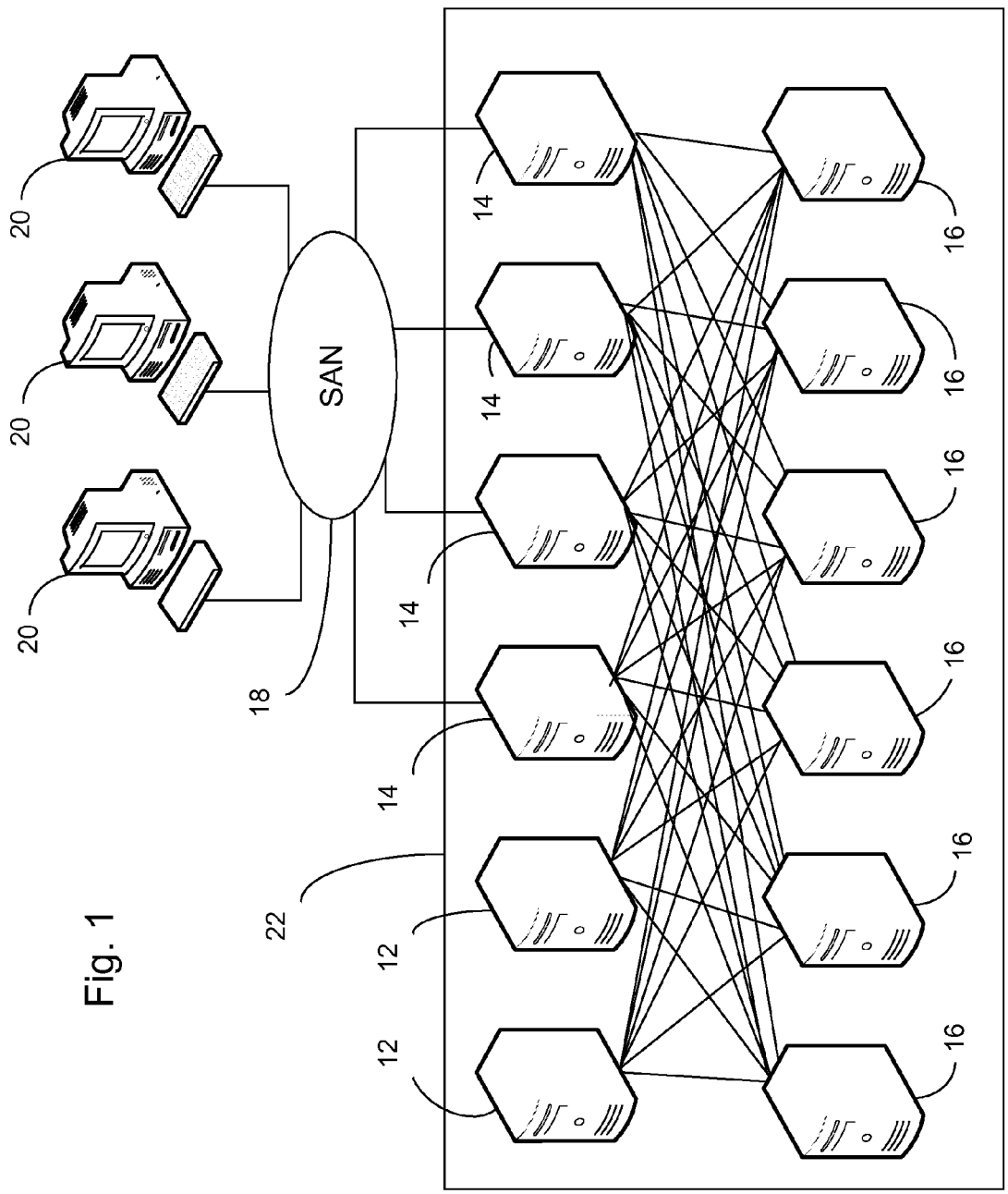

STORAGE APPLIANCE, APPLICATION SERVER AND METHOD THEREOF

BACKGROUND

Some currently available high-end storage appliances are designed as a cluster of servers that are responsible for storage functions. The servers are connected to each other via a low-latency, high-throughput network interconnect (e.g., InfiniBand, 10 Gbps Ethernet). Some or all servers have network adapters for external host connectivity, which may be slower than the cluster interconnect (e.g., Fibre Channel, 1 Gbps Ethernet). These servers are hereinafter referred to as "interface servers". In addition, some or all servers have local storage facilities (e.g., disk drives, flash) and are responsible for transferring data to and from this local storage. Such servers are hereinafter referred to as "storage servers". A single server may act both as an interface server and a storage server. A typical Input/Output (I/O) operation is initiated by an external host, arrives at an interface server, and is then routed to a specific storage server via the internal interconnect (possibly using a proprietary protocol). It is common for such system to use a group membership or other cluster communication algorithm to ensure the interface servers know which storage server has the physical medium for a particular I/O request. This cluster software is aimed at ensuring that correct routing is maintained in spite of failures or other reconfigurations of the mapping of data to the storage servers. This means that an I/O operation requires at least two hops, depending on the appliance and type of I/O. One can make a hierarchical classification of servers based on the distance between the host to the physical storage; looking top-down one would have storage servers, interface servers, and external hosts. The cost of each hop in terms of system resources is not negligible—it typically includes at least one data copy, interconnect latencies, and protocol and routing overheads.

SUMMARY

According to embodiments of the present invention there is provided a storage appliance system. The system may include at least one application server for locally executing an application and one or more storage servers in communication with the application server (or servers) for I/O transmission therebetween.

In accordance with embodiments of the present invention, there is also provided a method which may include providing a storage appliance system. The storage appliance system may include at least one application server for locally executing an application, and one or more storage servers in communication with said at least one application server for I/O transmission. The method may also include executing an application locally on the application server and communicating I/O transmissions between the application server and one or more storage servers.

In accordance with embodiments of the present invention, there is further provided a computer program product stored on a non-transitory tangible computer-readable storage medium. The computer program may include code for locally executing an application on an application server of a storage appliance system. The storage appliance system may include one or more application servers and one or more storage servers in communication with the application servers for I/O transmission. The method may further include communicating I/O transmissions between the application servers and the storage servers.

In accordance with embodiments of the present invention, there is also provided an application server for incorporation in a storage appliance system. The application server may be configured to locally execute an application and to communicate I/O transmission with at least one storage server.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 1 illustrates a storage appliance, according to embodiments of the present invention.

DETAILED DESCRIPTION

Figure 2B:
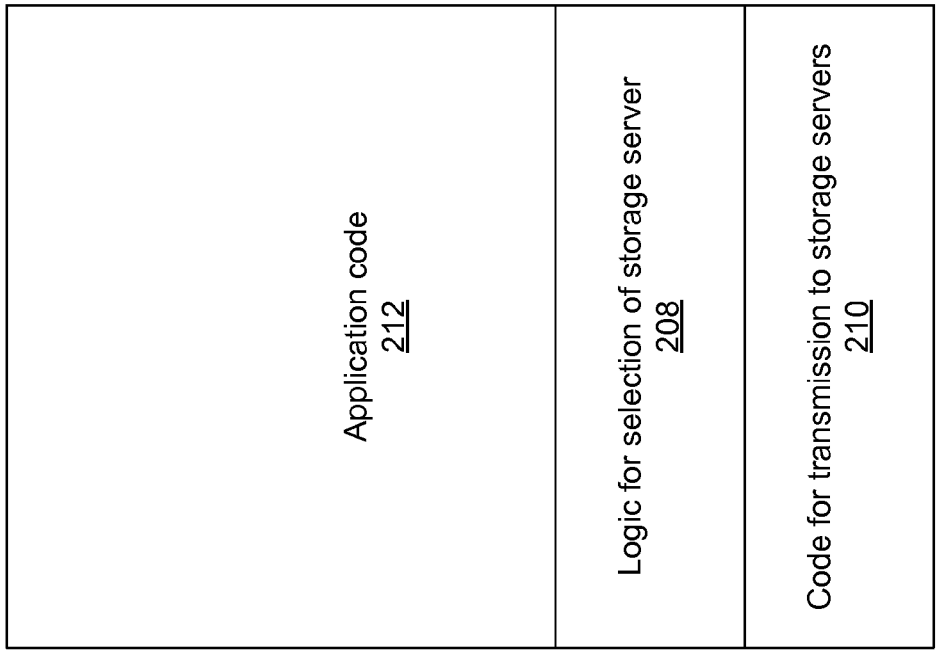
FIG. 2B illustrates an example of a code stack of application server software, in accordance with embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flowchart's and block diagram/s in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A "storage appliance" (sometimes also referred to as "storage controller") typically includes storage servers for storing data, and interface servers which may be used as intermediaries between hosts and the storing servers.

Reference is made to FIG. 1 illustrating a storage appliance, according to embodiments of the present invention. A typical storage appliance may include storage servers 16 and interface servers 14. An I/O request, which may include data and/or command, may be initiated by an external host 20, which may be communicated via a Storage Area Network (SAN) 18 to an interface server 14. The command is processed by the interface server 14 and data is retrieved from (in the case of a read request) or stored on (in case of a write request) a storage server 16.

In accordance with embodiments of the present invention, a new class of servers is introduced in a storage appliance, these servers referred hereinafter to as "application servers" that are practically equivalent to interface servers in terms of hierarchy. An application server 12 (FIG. 1) may access storage servers 16 in a single hop. At the same time an application server may incorporate the functionality of external hosts (e.g. by running data-intensive software) and interface servers (e.g. by accessing the storage in single hop).

In accordance with embodiments of the present invention an application server may be similar to an interface server in some ways: an application server may be connected to an internal network of storage appliances, it may run cluster membership software, and may be able to communicate with storage servers using the internal network of the storage appliances (e.g. using a proprietary protocol). An application server may be used to run an application, such as, for example, database application (e.g. DB2 by IBM™), scrubbing software, business analytics software, etc. The software running on the application server may then communicate directly with the storage servers, rendering interface servers unnecessary. An application server, in accordance with embodiments of the present invention differs from an interface server in that the failure or the addition of an application server may not cause a change in group membership of the cluster software.

In addition to the provision of physical connectivity to the internal network of the storage network, the software of an application server, in accordance with embodiments of the present invention, may be made to be aware of the cluster management software and internal communication protocol of the storage appliances. This functionality may be added to an application server by installing a device driver which has this knowledge; this provides a fairly accepted and standard way of extending this function. In addition to avoiding a communication hop, the approach of using a device driver may allow eliminating some of the protocol stack further reducing latency.

A typical interface server software code may include protocol-specific code (e.g. iSCSI, FC, etc.), code addressing queuing, quality-of-service code, code addressing logic for selecting the proper storage server for transmitting data to or from that storage server, and code to transmit (to or from) data to the storage servers.

Figure 2A:
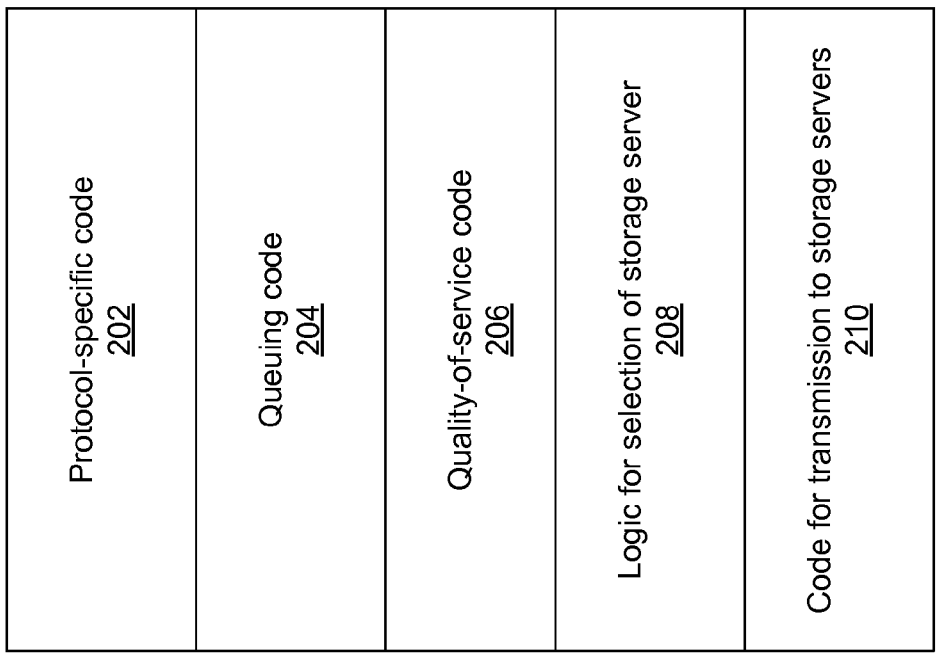
FIG. 2A illustrates an example of a code stack of typical interface server software.

FIG. 2A illustrates an example of a code stack of typical interface server software. This example of interface server software includes protocol specific code 202, queuing code 204, quality-of-service code 206, logic for selection of storage server 208 and code for transmission to and from storage server 210.

In accordance with embodiments of the present invention, software designed for an application server may include an application code designed to be executed on that application server (in fact, the application does not necessarily have to be specifically designed to run on this specific server as it may also be a software application that is designed to be executed on other computers too) and code to transmit data to or from one or more of the storage servers. FIG. 2B illustrates an example of a code stack of application server software, in accordance with embodiments of the present invention. Application code 212 is provided, which may be executed locally on the processing unit of the application server, and code for transmission to and from the storage servers 210 is also included. It may also include logic code for selection of storage server 208.

It is evident that most of the various software codes present in an interface server (FIG. 2A, except for the code for transmission to the storage server, and the logic for selection of the storage server) is aimed at facilitating proper communication between a host and the interface server. The application server, according to embodiments of the present invention may include application code, which is designed to be executed locally on the application server, code facilitating proper communication between the application server and the storage servers, and possibly logic for selection of the storage server. In application servers, in accordance with embodiments of the present invention, data is not transferred via the application server which traverses between an external device (e.g. host) and a storage server. Rather, the application server may maintain communications only with storage servers.

While in principle, in accordance with embodiments of the present invention a stand-alone storage appliance system may be provided, including only one or more application servers and one or more storage servers, a typical storage appliance system would include one or more (typically a plurality of) storage servers, one or more application servers, and one or more (typically a plurality of) interface servers for communicating with hosts.

In accordance with some preferred embodiments of the present invention a hybrid type application server is provided.

Figure 3:
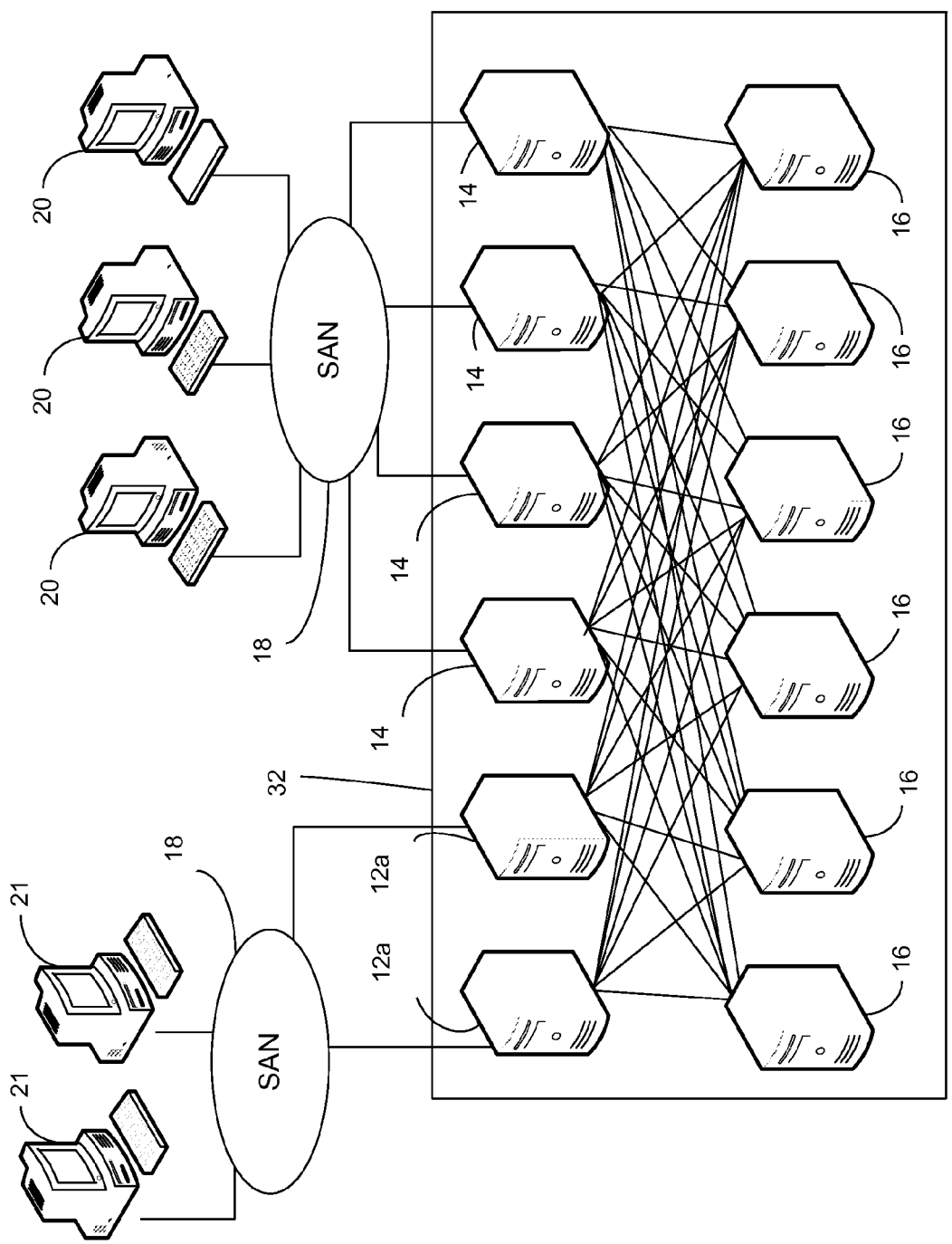
FIG. 3 illustrates a storage appliance system with hybrid application servers, in accordance with embodiments of the present invention.

FIG. 3 illustrates a storage appliance system with hybrid application servers in accordance with embodiments of the present invention.

Storage appliance system 32 may include storage servers 16 and interface servers 14. Hybrid application servers 12a are also included, each which are aimed at executing an application and communicating with the storage servers 16, but which is also configured to act as an interface server, communicating with hosts 21 via SAN 18.

The application may be designed to be executed on a number of machines, such as, for example, several application servers or one or more application servers and one or more additional hosts. For example, some parts of the application may run on one or more application servers, while the rest may be designed to run on one or more external hosts. For example, one may have distributed analytics software configured to be executed on eight machines, wherein two of these machines may be application servers, while the remaining six would be external hosts.

In accordance with some embodiments of the present invention, instead of having both the interface server code and the application server code run directly on the hardware, a hypervisor may be used to run one or both inside virtual machines. For example, a hypervisor may be used to more easily add application server functionality to an interface server.

Figure 4:
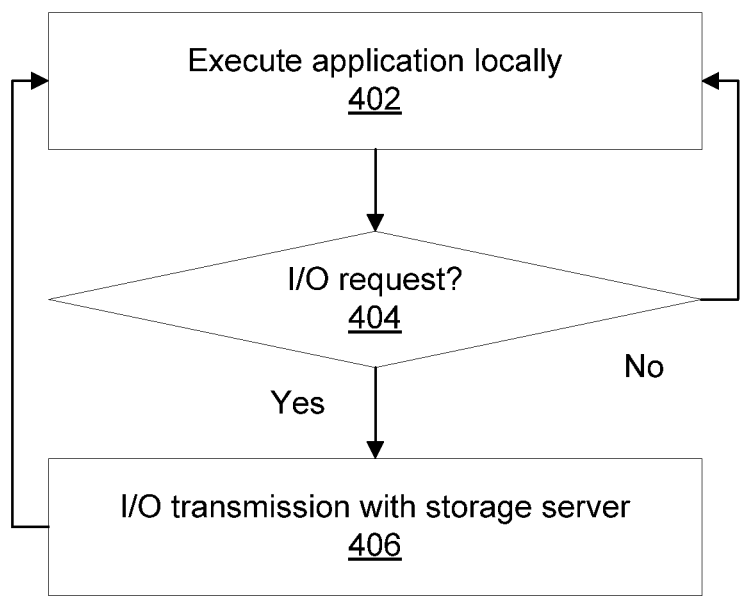
FIG. 4 illustrates a method for operating an application server in accordance with embodiments of the present invention.

FIG. 4 illustrates a method for operating an application server in accordance with embodiments of the present invention.

An application may be executed locally 402 on the application server. If an I/O request is generated 404, I/O transmission 406 may be performed between the application server and the storage server.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A storage appliance system comprising:
    one or more storage servers connected in a cluster to service storage requests submitted by one or more host devices located remotely in relation to the one or more storage servers in the storage appliance system;
    one or more interface servers, located locally in relation to the one or more storage servers, wherein at least one interface server is configured to act as a conduit to receive a storage requests generated by a target application executed on a host device and to communicate said storage request to at least one of the storage servers;
    an application server, located locally in relation to the one or more storage servers,
    wherein at least one processor on the application server supports the local execution of the target application, such that the target application is executed directly on the application server, so that communications for transmitting and servicing the storage requests submitted by the target application are directly communicated between the application server and the storage servers to reduce or eliminate need for remote data communications between the one or more storage servers and the host device.

2. The system of claim 1, wherein the target application locally executed on the application server comprises a device driver that is aware of cluster management software and internal communication protocol of the storage appliance system such that the device driver supports a communication protocol stack facilitating communication between the application server and the one or more storage servers, and selecting a target storage server from among said one or more storage servers.

3. The system of claim 1, wherein the target application is selected from a group of applications consisting of a database application, a scrubbing application, and a business analytics application.

4. The system of claim 1, wherein the target application is executed on the application server, in response to determining that the target application is data intensive, and otherwise the target application remains executing on the host device.

5. The system of claim 4, wherein the target application is executed on one or more other machines selected from the group of machines consisting of application servers and hosts.

6. The system of claim 1, wherein said at least one application server comprises at least one hybrid application server also configured to communicate with one or more host devices.

7. A data storage method comprising:
connecting one or more storage servers in a cluster to service storage requests submitted by one or more host devices located remotely in relation to the one or more storage servers in the storage appliance system;
wherein one or more interface servers are located locally in relation to the one or more storage servers,
configuring at least one interface server to act as a conduit to receive a storage requests generated by a target application executed on a host device and to communicate said storage request to at least one of the storage servers;
configuring an application server, located locally in relation to the one or more storage servers, to support the local execution of the target application, such that the target application is executed directly on the application server, so that communications for transmitting and servicing the storage request submitted by the target application are directly communicated between the application server and the storage servers to reduce or eliminate need for remote data communications between the one or more storage servers and the host device.

8. The method of claim 7, wherein the application locally executed on the application server comprises a device driver that is aware of cluster management software and internal communication protocol of the storage appliance system such that the device driver supports a communication protocol stack facilitating communication between the application server and the one or more storage servers, and selecting a target storage server from among said one or more storage servers.

9. The method of claim 7, wherein the target application is selected from a group of applications consisting of a database application, a scrubbing application, and a business analytics application.

10. The method of claim 7, wherein the target application is executed on the application server, in response to determining that the target application is data intensive, and otherwise the target application remains executing on the host device.

11. The method of claim 10, wherein the target application is executed on one or more machines selected from the group of machines consisting of application servers and hosts.

12. The method of claim 7, wherein said at least one application server comprises at least one hybrid application server also configured to communicate with one or more hosts, the method comprising communicating I/O transmissions between said at least one hybrid application server and one or more host devices.

13. A computer program product comprising program coded stored on a non-transitory data storage medium, wherein execution of the program code including on a computer causes the computer to:
connect one or more storage servers in a cluster to service storage requests submitted by one or more host devices located remotely in relation to the one or more storage servers in the storage appliance system;
wherein one or more interface servers are located locally in relation to the one or more storage servers,
configure at least one interface server to act as a conduit to receive a storage requests generated by a target application executed on a host device and to communicate said storage request to at least one of the storage servers;
configure an application server, located locally in relation to the one or more storage servers, to support the local execution of the target application, such that the target application is executed directly on the application server, so that communications for transmitting and servicing the storage request submitted by the target application are directly communicated between the application server and the storage servers to reduce or eliminate need for remote data communications between the one or more storage servers and the host device.

14. The computer program product of claim 13, wherein the target application is selected from a group of application consisting of a database application, a scrubbing application, and a business analytic application.

15. The computer program product of claim 13, wherein the target application is executed on the application server, in response to determining that the target application is data intensive, and otherwise the target application remains executing on the host device.

16. The computer program product as claimed in claim 15, wherein the target application is executed on one or more machines selected from the group of machines consisting of application servers and hosts.

17. The computer program product of claim 13, wherein said at least one application server comprises at least one hybrid application server also configured to communicate with one or more hosts, the computer program product including code for communicating I/O transmissions between said at least one hybrid application server and one or more hosts.

* * * * *